United States Patent [19]  [11] 4,060,900
Greenwood  [45] Dec. 6, 1977

[54] ANGLE MEASURING DEVICE

[76] Inventor: Michael Peter Greenwood, Breckenborough Hall, Thirsk, Yorkshire, England

[21] Appl. No.: 692,422

[22] Filed: June 3, 1976

[30] Foreign Application Priority Data

June 26, 1975 United Kingdom ............... 27120/75

[51] Int. Cl.² ............................................. G01B 5/24
[52] U.S. Cl. .................................... 33/75 R; 33/1 N; 235/88 M
[58] Field of Search ............ 33/1 N, 75, 149 R, 27 B, 33/174 E, 148 R; 235/77, 78, 88

[56] References Cited

U.S. PATENT DOCUMENTS

| 713,096 | 11/1902 | Hess | 33/75 R |
| 774,858 | 11/1904 | Trisler | 33/75 R |
| 1,299,978 | 4/1919 | MacDowney | 33/75 R |
| 1,539,868 | 6/1925 | Roberts | 235/78 M |
| 2,353,309 | 7/1944 | Johnson | 235/88 |
| 3,045,353 | 7/1962 | Barbosa | 33/149 R |

FOREIGN PATENT DOCUMENTS 342,099  1/1931  United Kingdom ................. 33/1 N Primary Examiner—Richard E. Aegerter
Assistant Examiner—John W. Shepperd
Attorney, Agent, or Firm—Stevens, Davis, Miller & Mosher

[57] ABSTRACT

An angle measuring device including two discs pivoted together at their common center for relative rotation, each disc having a slit extending from its center to its periphery and arranged so that, on relative rotation of the discs, a scale provided on the device indicates the amount of relative rotation.

1 Claim, 6 Drawing Figures

-FIG. 2-

ANGLE MEASURING DEVICE

This invention relates to devices for measuring or marking out angles.

A conventional protractor consistent of a single sheet of material, for instance rigid, transparent plastics material, having a circular or semi-circular shape, marked with radial lines and having a scale indicating angles about the periphery of the sheet.

According to the present invention there is provided a device for measuring or marking out angles comprising two substantially superimposed discs which are pivoted together at their common centre for relative rotation between the discs, each disc having a slit extending from its centre to its periphery, the periphery of at least one of the discs being provided with a scale so that, on relative rotation of the discs from a first position where one disc substantially wholly underlies the other disc to a second position in which each disc has been rotated at least partly through the slit in the other disc, the scale indicates the amount of rotation between the first and second positions.

A device in accordance with the present invention is capable of measuring angles up to 360°. The device is a useful teaching instrument having the advantage over a conventional protractor that, from the first, closed position the device has to be operated manually to open it to fit the angle to be measured or, alternatively, to be marked out.

The scale may be arranged so that only that part of the scale is visible which corresponds to the angle being measured, that is to say, that part of the scale which is not being used in the measurement of an angle will be concealed by an opaque, overlying portion of the disc not provided with a scale. Preferably, scales are provided on each disc on opposite sides of the instrument and arranged so that the unused scale part of one disc is concealed by the opaque reverse of the scale of the other disc. The two scales may be identical or different.

An embodiment of the invention will now be described by way of example only and with reference to the accompanying drawings in which.

Figure 1:
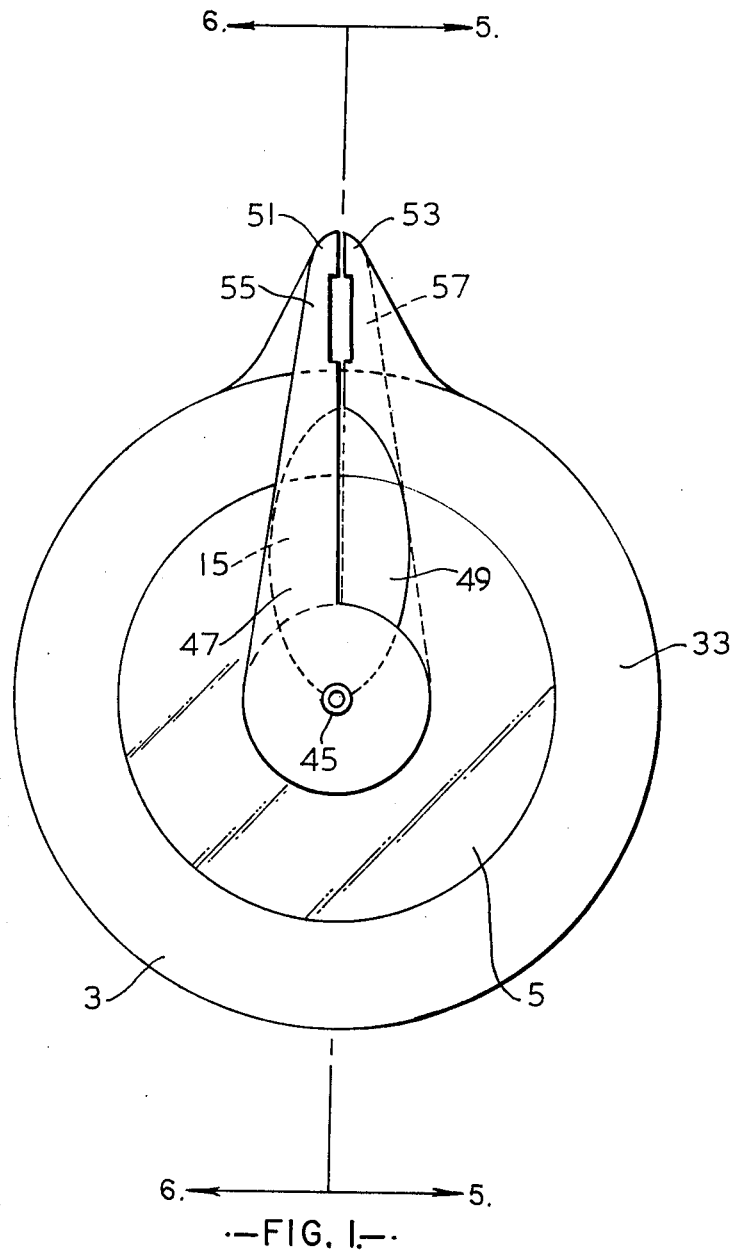
FIG. 1 is a top plan view of a device in accordance with the present invention in the closed position.

Referring to the drawings a device for measuring or marking out angles in accordance with the present invention includes two discs 1 and 3. Each of these discs has a central transparent portion 5 and a peripheral opaque ring 7.

Disc 1 is provided along substantially the whole of peripheral portion 7 with a scale 8 marked in degrees from 0° to 360°. Disc 1 is further provided with a slit 9 which extends from the centre 11 of the disc to the periphery of the disc at the point 13 corresponding to 0° on the scale. As can be seen on the drawing, slit 9 does not extend along a radius but follows a curved path from centre 11 to the opaque portion 7 of the disc. It then extends across the opaque portion to the periphery of the disc near the 0° marking thereon. As a result there is provided a retaining tongue 15 bounded by slit 9 and a line 17 (the zero line) which extends radially from centre 11 to that portion of the slit in opaque ring 7.

Disc 1 is also provided with a pointer 19 attached to the peripheral edge of the disc. One straight edge 21 of pointer 19 is substantially an extension of the zero line on the scale although there is provided a slightly recessed portion 20 to allow the zero line to be accurately positioned with respect to a given drawn line. The other edge of pointer 19 is generally curved from the outer extremity of edge 21 to the outer edge of ring 7.

Disc 3 is similar to disc 1 having the same radius and inner transparent and outer opaque portions of substantially the same dimensions as those of disc 1. Disc 3 is also provided with a slit similar to slit 9 of disc 1 and a pointer which is similar to pointer 19 of disc 1 except that the straight edge 31 faces in the opposite direction to straight edge 21 of pointer 19. Although the top side of the opaque ring 33 of disc 3 is blank as shown in FIG. 1 the opposite side is provided with a scale which is similar to scale 8 of disc 1 except that markings are only given in multiples of 10°.

The device also includes two retaining strips 35 comprising a small circular portion 37 together with an arm 39 extending from circular portion 37, one edge 38 of arm 39 being radial with respect to circular portion 37 except for recessed portion 40 which corresponds to the recessed portion on one or other of the discs 1 and 3. Arm 39 is formed at its free end into a pointer 41. The other edge 42 of arm 39 together with line 44, extending from edge 42 to centre 43 of circular portion 37, are shaped so that they overlie most of slit 9 on disc 1 or the corresponding slit on disc 3 when the device is assembled. The area bounded by edges 38 and 42 and line 44 may be coloured or black for increased visual impact.

The above described components of the device are fastened together by means of a tubular rivet 45 which passes through the centre 11 of disc, the centre of disc 3 and the centres 43 of the two retaining strips 35. As shown in FIG. 1 the order of arrangement of the items on the tubular rivet 45 is as follows:

a. the uppermost component is a retaining strip 47;
b. underlying retaining strip 47 is disc 3;
c. underlying disc 3 is disc 1;
d. underlying disc 1 is the second retaining strip 49.

Top retaining strip 47 is attached to disc 1 at the radially outermost extremity of retaining strip 47 and pointer 19, that is, at the position marked 51 in FIG. 1. Similarly disc 3 is attached to the bottom retaining strip 49 at position 53.

Although, as stated above, disc 1 underlies disc 3 when the device is in the closed position shown in FIG. 1, in fact the retaining tongue 15 of disc 1 is positioned between top retaining strip 47 and disc 3.

Figure 2:
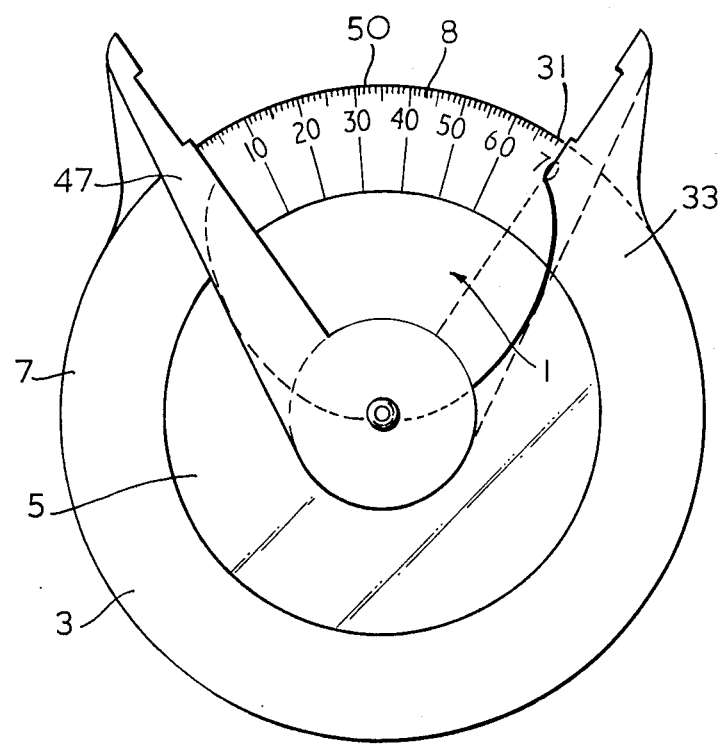
FIG. 2 is a top plan view of the device of FIG. 1 but showing the device in an open position.
Figure 3:
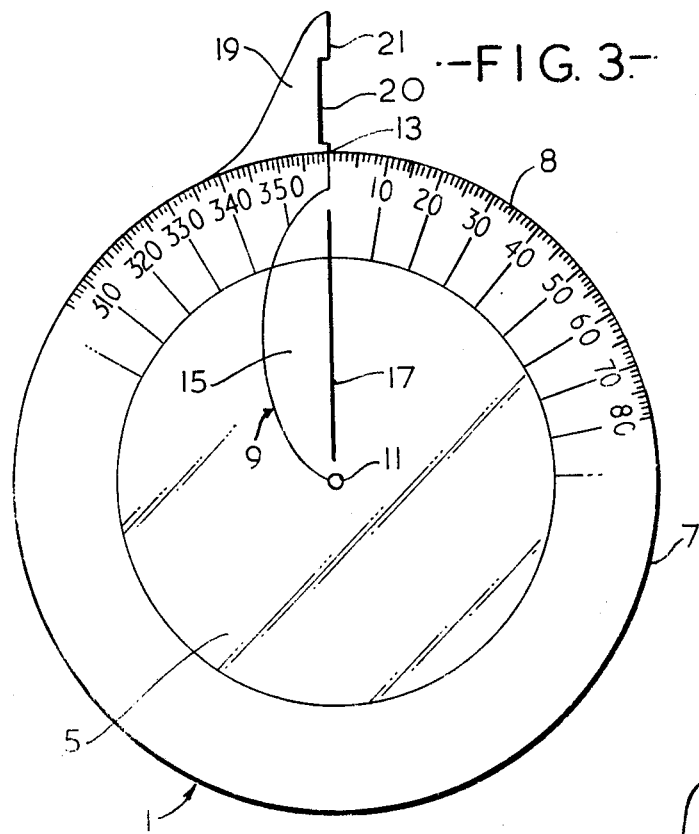
FIG. 3 is a top plan view of one of the discs of the device shown in FIG. 1.
Figure 4:
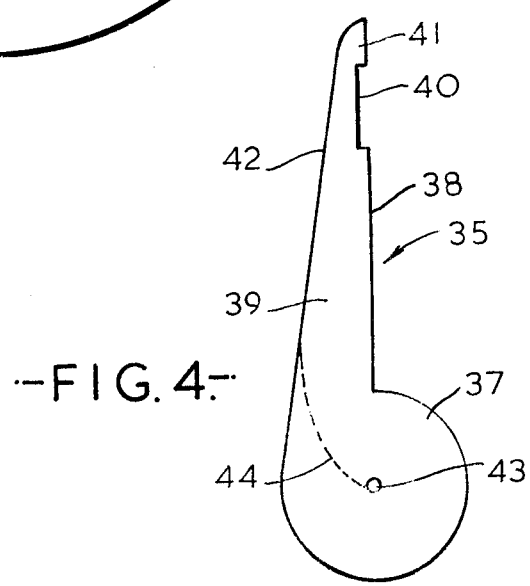
FIG. 4 shows a retaining strip for the device shown in FIG. 1.
Figure 5:
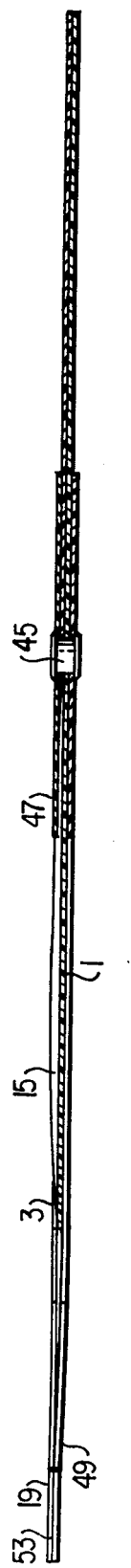
FIG. 5 is a view in section taken on line 5—5 of FIG. 1.
Figure 6:
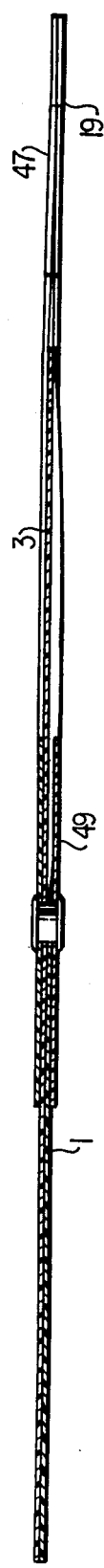
FIG. 6 is a view in section taken on the same line but looking in the opposite direction.

Due to the connections between the top retaining strip 47 and disc 1 on the one hand and between strip 3 and bottom retaining strip 49 on the other, the retaining strip 47 and disc 1 may be moved about rivet 45 relative to disc 3 and bottom retaining strip 49. This may for instance be conveniently done by grasping each disc and associated retaining strip at the areas designated 55 and 57 and then pulling these portions away from each other. The device is shown in FIG. 2 after such an operation has been performed. It will now be seen that a portion 50 of scale 8 is revealed between retaining strip 47 and the right hand edge 31 of disc 3. This has occurred because on pulling the portions 55 and 57 away from each other, that part of discs 1 carrying the portion of the scale which is now revealed has passed over the top of disc 3. This is ensured because of the presence of the retaining tongue 15 overlying disc 3.

It will be appreciated that portions 55 and 57 can be pulled apart or rather moved in relatively opposite directions about rivet 45 until substantially the whole of disc 1 lies above disc 3 and accordingly substantially the whole of the scale is revealed. The retaining strips 47 and 49 prevent rotation of the discs beyond an angle of, say, about 350° so that the discs cannot be moved out their relative positions as described above. Thus, at an angle of about 350° the retaining strips and their associated pointers on the discs come into contact with each other.

In order to measure an angle by means of the above described device, it is merely necessary to adjust the positions of edges 31 and 38 until they are aligned with the sides of the angle to be measured. The reading on the scale directly below edge 31 then gives the angle to be measured. If a particular angle is to be marked out then it is merely necessary to open out the device until the scale reading below edge 31 corresponds to the desired angle and then portions of the sides of the angle may be marked out using edges 31 and 38 beyond the circular edges of the discs.

The device may be made of any suitable sheet like materials. Thus the discs and retaining strips may be made of coloured, black or non-coloured transparent plastics material and the opaque rings may be provided by opaque plastics or paper or cardboard material firmly secured to the transparent plastics material. In an alternative embodiment however, each disc may consist of a single piece of plastics material having opaque and transparent portions.

For ease of manufacture, each retaining strip and associated disc may be cut or otherwise shaped as a single piece of material, initially in a single plane, and the retaining strip portion then folded over the disc to produce the desired conformation.

It should be appreciated that many modifications or variations could be made to the above-described embodiment without departing from the scope of the present invention. As an example, the tubular rivet 45 may be replaced by a transparent solid rivet with a centre dot, leaving visible the whole of the lines about the angle to be measured. Furthermore the "zero lines" on the retaining strips may be lines on the strips rather than straight edges provided on the strips themselves.

I claim:

1. A device for measuring or marking out angles comprising two discs, each having curved margins extending for most of the periphery thereof, each disc having a slit extending from its center to its periphery along a path defining with a radius a tongue portion, said discs being superimposed so that the tonque portions face and overlie each other, limiting means fixed to each disc at a location radially beyond the curved margin therein and extending in overlying relationship to the other disc and means passing through said limiting means and said discs to mount said discs for relative rotation about a common axis from a closed position in which all but the tongue of each disc lies on one side of the other disc to a position in which further rotation is prevented by said limiting means, the margin of the surface of a disc which faces the surface of the other disc having a scale thereon so that as the discs are moved from the closed position the scale is progressively revealed.

* * * * *